United States Patent [19]
Jacobs

[11] 3,952,534
[45] Apr. 27, 1976

[54] ICE CREAM MAKER FOR REFRIGERATOR

[75] Inventor: James W. Jacobs, Dayton, Ohio

[73] Assignee: General Motors Corporation, Detroit, Mich.

[22] Filed: Feb. 24, 1975

[21] Appl. No.: 552,429

[52] U.S. Cl. .......................... 62/136; 259/DIG. 32; 74/849
[51] Int. Cl.² ............................................ A23G 9/12
[58] Field of Search .......................... 62/136, 342; 259/DIG. 34, DIG. 32; 74/849

[56] References Cited
UNITED STATES PATENTS
2,757,550  8/1956  Weinfurt .............................. 74/849
2,808,706  10/1957  Updegraff ........................... 62/136

*Primary Examiner*—William E. Wayner
*Attorney, Agent, or Firm*—Edward P. Barthel

[57] ABSTRACT

An automatic ice cream maker add-on accessory for use in the freezer compartment of a domestic refrigerator including a rear freezing air intake with a fan induced forward split flow path. A dual state thermostat provides cycling sequencing and hold control by means of first bimetal contacts to control cycling of the unit from a combined dasher and fan operation to a fan only operation by means of a voltage drop resistor to change the voltage on the motor when a predetermined mix temperature is reached under load. A second bimetal contact member, also sensitive to the temperature of the ice cream, provides a long term feature on the completion of the mixing operation.

5 Claims, 12 Drawing Figures

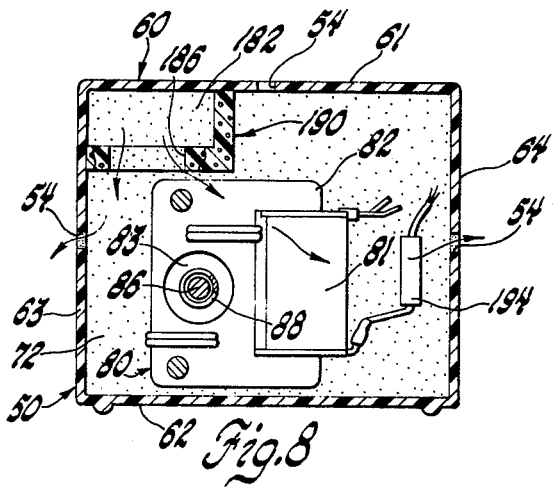
Fig.8
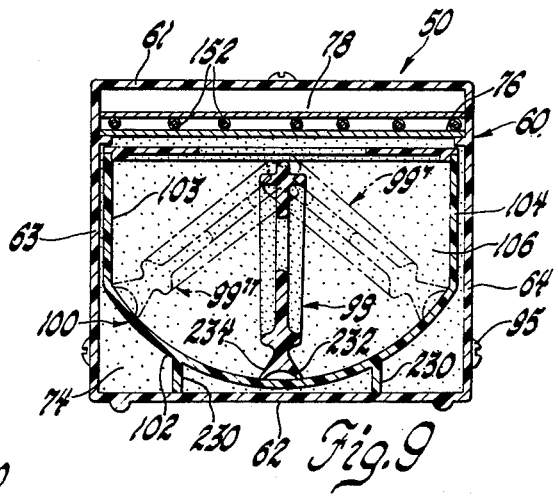
Fig.9
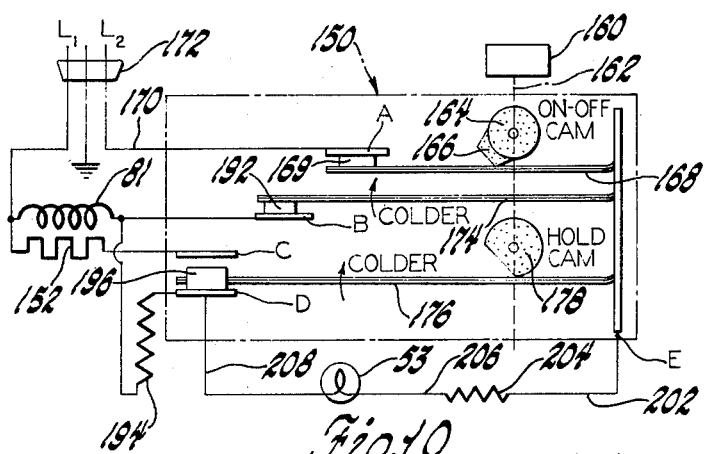
Fig.10
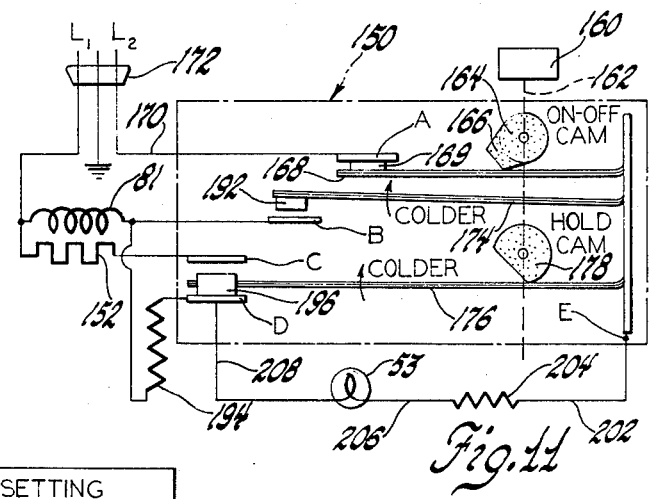
Fig.11
| THERMAL CONTROL ASSEMBLY | CONTROL KNOB SETTING | | | |
|---|---|---|---|---|
| | OFF | SOFT | MEDIUM | HARD |
| CONTACT A | OPEN | CLOSED | CLOSED | CLOSED |
| CONTACT B | CLOSED | OPENS 23°F | OPENS 23°F | OPENS 23°F |
| CONTACT C | OPEN | CLOSES 18°F | CLOSES 14°F | CLOSES 10°F |
| CONTACT D | CLOSED | OPENS 20°F | OPENS 16°F | OPENS 12°F |
Fig.12

ICE CREAM MAKER FOR REFRIGERATOR

This invention is directed to an automatic ice cream mixing accessory adapted for use within the freezing compartment of a domestic refrigerator.

There has long been a need for an ice cream making appliance that can be offered as an add-on feature or accessory for a domestic refrigerator which allows for the automatic preparation of ice cream and similar food products within the refrigerator freezing compartment. Because of the complexity of the modern day refrigerators having timed defrost cycles and various temperature zones that must remain in balance with the several compartments such as an automatic ice cream maker has been thought to be too complex to be marketable. Applicant has devised a compact automatic ice cream maker together with a control system therefor which allows the housewife to make from 1 to 3 pints of "soft", "medium" or "hard" ice cream in a relatively short period of time by simply setting a thermostatic control knob to either a "soft", "medium" or "hard" position. Applicant's device also allows the housewife to maintain the temperature condition of the resulting ice cream for an indefinite storage period.

It is therefore an object of the present invention to provide an automatic frozen dessert making appliance which may be used as add-on optional equipment or a built-in accessory for a domestic refrigerator. In its add-on form the unit has an electrical cord and plug arrangement which may be received in a complementary receptacle within the freezer compartment to provide energization for the appliance unit.

It is another object of the present invention to provide an automatic ice cream maker for a domestic refrigerator having a cycling, sequencing and hold control in the form of a dual state thermostat having first contact means to control the cycling of the unit from a combined dasher and fan operation to a fan only operation by means of a voltage drop resistor operative to change the voltage on the fan motor when a predetermined mix temperature is achieved. The control means includes a second bimetal contact also sensitive to the temperature of the ice cream mixture providing a "long term"term hold feature on the completion of the mixing operation, which enables the housewife to set a thermostatic control knob to either a "soft", "medium" or "hard" position to maintain the temperature condition of the ice cream for an indefinite period of time by means of a heating element located within the upper portion of the housing above the mixing tray.

These and other objects and advantages will become apparent from the following description, reference being had to the accompanying drawings wherein a preferred embodiment of the invention is clearly shown.

In the Drawings:

FIG. 8 is a vertical sectional view taken on the line 8—8 of FIG. 3;

FIG. 9 is a vertical sectional view taken on the line 9—9 of FIG. 3;

FIG. 10 is a schematic diagram of the thermal control assembly showing the control in the "Soft" position during a "mixing" function;

FIG. 11 is a view similar to FIG. 10 showing the control in the "On" position providing a "Hold" setting during a "hold" function; and FIG. 12 is an operational chart for the ice cream maker control settings.

Figure 1:
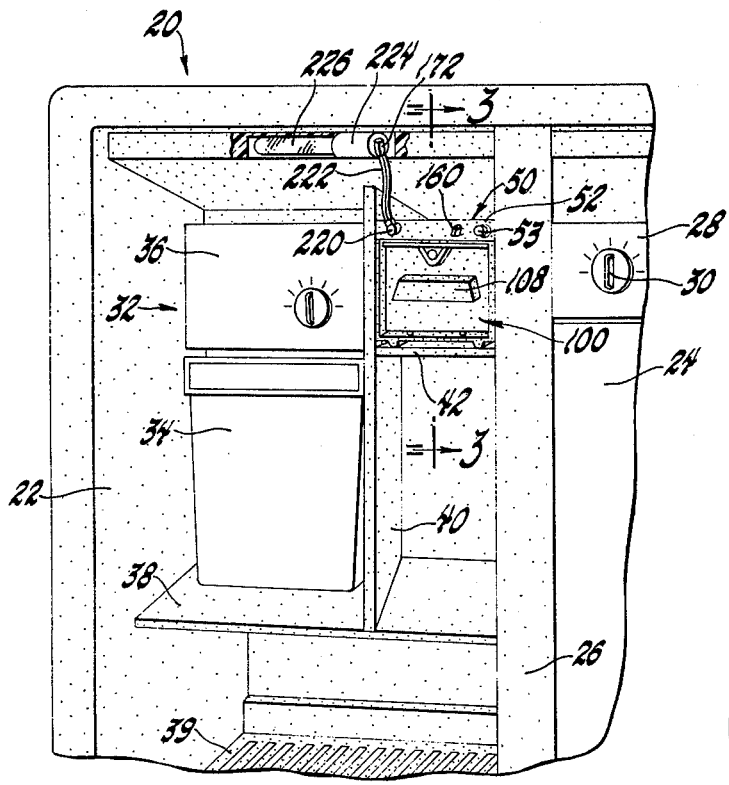
FIG. 1 is a fragmentary perspective view of the freezer compartment of a self-defrosting side-by-side domestic refrigerator having installed therein an automatic ice cream maker of the present invention with the doors of the refrigerator being omitted.

Referring now to the drawings and more particularly to FIG. 1, numeral 20 indicates the cabinet of a conventional frost-proof side-by-side refrigerator with the doors omitted to show the upper portion of the left hand freezer compartment 22 and a portion of the right hand above-freezing fresh food compartment 24 separated by vertical insulated partition wall 26. A portion of the refrigerator control panel is shown at 28 with the air flow damper control knob indicated at 30. In the disclosed embodiment the freezer section 22 has an automatic ice maker mechanism indicated generally at 32 including a lower ice piece storage bin 34 subjacent to automatic ice maker 36. The bin 34 is supported above a shelf 38, over evaporator section 39, having a vertical partition 40 extending above the shelf supporting a horizontal shelf 42 extending between the partition 40 and the vertical partition wall 26 with the shelf 42 shown supporting an automatic ice cream maker, generally indicated at 50, which is the subject matter of the present invention.

Figure 2:
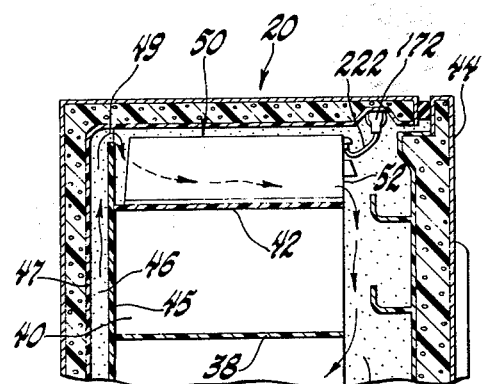
FIG. 2 is a fragmentary vertical sectional view through the upper portion of a freezer compartment of the side-by-side refrigerator of FIG. 1 showing one type of air flow arrangement for the ice cream maker.

As seen in FIG. 2, depicting the left hand freezer door 44 in its closed position a vertical duct 45 having passage or channel 46 is provided on the inner face of the refrigerator back wall 47 and having a top exit 49 which delivers sub-zero freezing refrigerator air from the evaporator 39 into the passage 46 for flow directly into the rear intake means of the automatic ice cream maker 50. As indicated by the dashed arrows in a portion of the freezer in FIG. 2, air flows through the ice cream maker for exiting through exit means at the ice cream maker front and below front panel 52 for return to the freezer compartment 22. A portion of the air flow, initiated by solid arrows, exits through intermediate side exit means shown at 54 (FIG. 4) after cooling the drive motor to be described.

Figure 3:
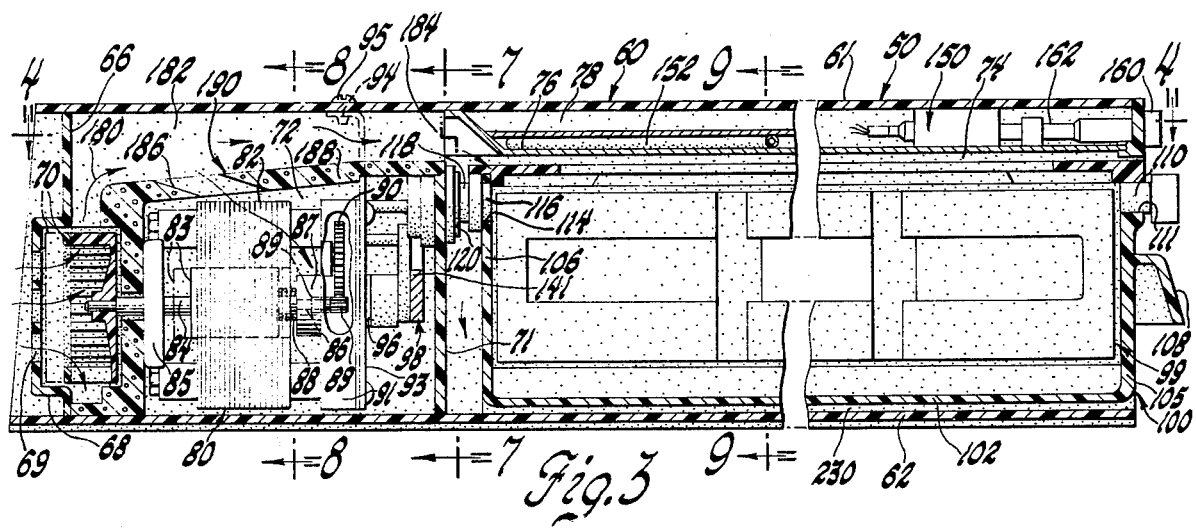
FIG. 3 is a vertical sectional view taken on the line 3—3 of FIG. 1.

With reference to FIGS. 3–8, the automatic ice cream maker assembly 50 is shown including an outer rectangular housing 60 including a top wall 61, a bottom wall 62, side walls 63, 64 and an aft recessed wall 66 having a rearwardly extending integral cup-shaped recess 68, having air inlets 69, for receiving a portion of concentrically aligned fan means in the form of blower wheel 70. As best seen in FIG. 3, the housing includes an intermediate partition wall or barrier 71 which divides the housing into a rear machinery chamber 72, and a front freezing and mixing chamber 74. The forward portion of the housing includes a horizontally disposed plate 76 defining an upper electrical control chamber 78.

Figure 4:
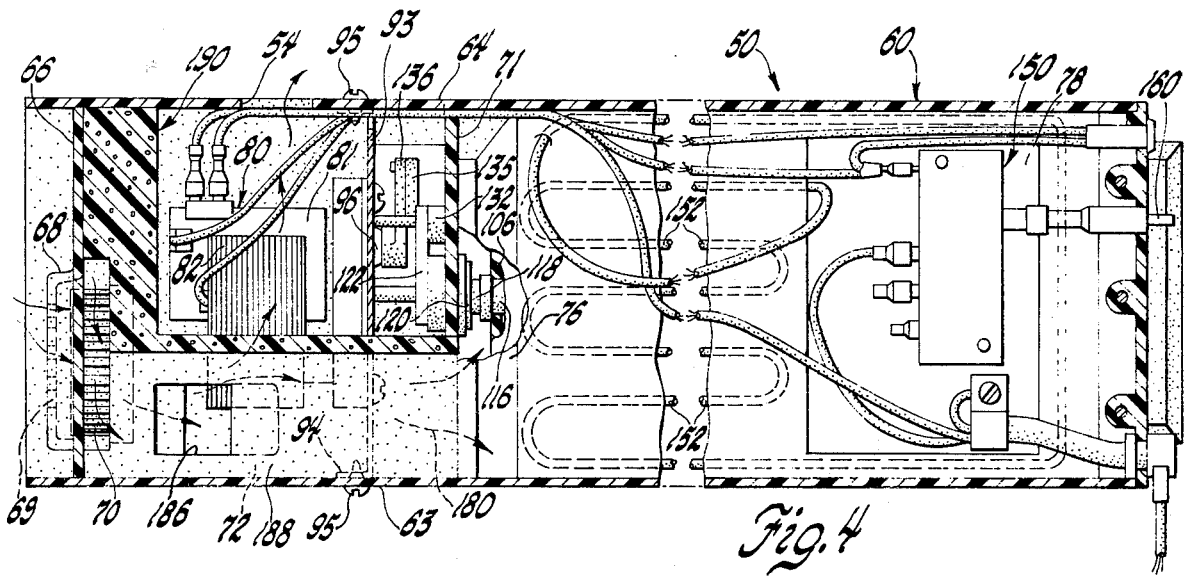
FIG. 4 is a horizontal sectional view taken on line 4—4 of FIG. 3.
Figure 5:
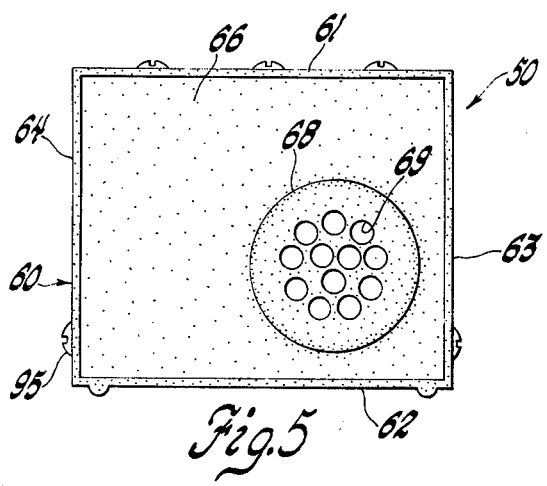
FIG. 5 is a rear elevational view of the ice cream maker.
Figure 6:
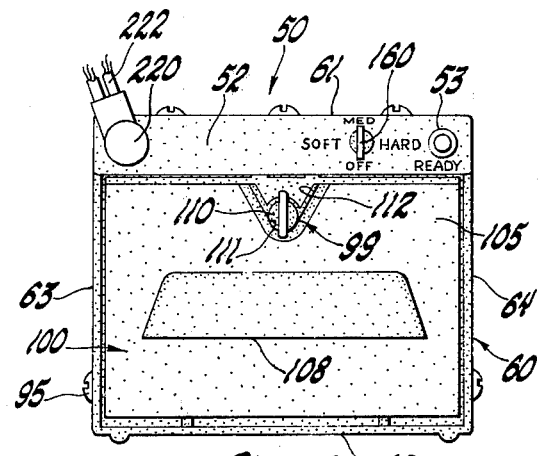
FIG. 6 is a front elevational view of the ice cream maker.
Figure 7:
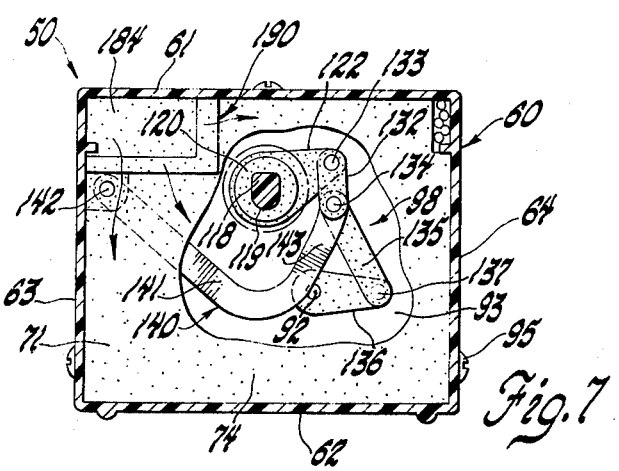
FIG. 7 is a vertical sectional view taken on the line 7—7 of FIG. 3.

As best seen in FIGS. 3 and 4, the motor chamber 72 encloses a power assembly in the form of an electrical drive motor, generally indicated at 80, including motor windings 81 and stator 82, together with a motor rotor 83. The motor rotor 83 has a rearwardly extending shaft 84 supported in journal bearing 85 and a forwardly extending front shaft 86 supported in journal bearing 87 allowing the rotor to move axially under the influence of the stator magnetic field. The front shaft 86 has a pinion gear 89 located at its forward end which functions as clutch means for driving engagement with a spur gear 90, located in a gear box 91 having an output drive shaft 92. The gear box 91 and motor 80 are supported from a mounting plate or partition wall 93 with side flanges 94 suitably affixed as by screws 95 to the housing side walls. The gear box 91 provides gear reduction with its forwardly extending drive shaft 92 (FIG. 7) journaled in bearing means 96 and extending through an aperture in the plate 93 for connection via mechanical linkage arrangement 98 to a dasher or agitator member 99 to provide oscillatory movement of the dasher about its longitudinal axis.

As seen in FIG. 3, a mixing receptacle or tray, generally indicated at 100, is dimensioned to be slidably received in the open front end of the mixer housing 60. The mixing tray is preferably made of a plastic such as polypropylene material providing a one piece integral tray member. The tray 100 is generally box-shaped in configuration having an arcuate shaped bottom wall, as shown at 102 in FIG. 9, merging with vertical side walls 103 and 104 and substantially rectangular upright or vertical front 105 and rear 106 walls. Handle means such as integral handle 108 is provided on the tray front wall 105 to allow the user to grip the tray for easy removal from the housing 60.

The longitudinally extending dasher or agitator 99 is supported within the tray 100 by having its integral forward hub 110 journaled in centrally located semicircular bearing 111 defined by a lead-in slot 112 in the front wall 105. The tray rear wall 106 has a circular aperture 114 for the journaled reception of a dasher rear hub 116. A male coupling portion 118, extending rearwardly from the dasher rear hub 116, has a generally rectangular cross section (FIG. 7) including an arcuate lower portion 119 which is removably received or coupled in a conforming female drive socket 120 which is preferably integrally molded on one end of dasher drive arm 122 to be described.

An important feature of applicant's ice cream maker is to whip air into the ice cream mix (not shown) in the tray while it freezes. This imparts smoothness, texture and to a degree taste, while increasing the mix's volume. In the instant case this is accomplished by oscillating the dasher member 99 through a defined included angle, which in the disclosed form is about 110 degrees, while fan means in the form of blower 70 pulls freezing air through the rear air inlet 69 and over the ice cream mix in the tray. The dasher whips the mix and aids the freezing process until the desired texture of the ice cream is achieved. At this point control means to be described causes the dashing to automatically stop while continuing to operate the fan until the desired "hold" temperature is reached. The control panel indicating light 53 will then indicate that the confection or ice cream is ready for serving at the desired consistency or hardness.

The desired mixing for the confection results from the oscillation of the dasher 99 effected by the motor through the releasable coupling means of members 118 and 120 by drive train means including driven gears in box 91 and the mechanical linkage generally indicated at 98. More specifically, the linkage assembly includes a dasher arm link 132 secured by a pivot pin 133 to the outer end of the dasher drive arm 122 while the other end of the dasher arm link 132 is secured by pivot pin 134 to the upper end of a motor arm link 135. The lower end of the motor arm link 135 is secured to motor drive arm 136 by pivot pin 137 while the inner end of arm 136 is fixedly secured to the gear box output drive shaft 92. A substantially J-shaped guide arm 140 has the end of its long leg 141 provided with a shaft 142 mounted by bearings in wall 93, while the end of its short leg 143 is secured to the pivot pin 134 for location between the dasher arm link 132 and the motor arm link 135. Thus, as the linkage 98 moves downwardly from its top center position, as a result of downward clockwise rotational movement imparted by the motor drive arm 136, with the link members 135 and 136 in vertical alignment with the short leg 143 of the J-shaped grid arm, the pivot pin 137 is moved to its right-of-center position adjacent wall 64 as viewed in FIG. 7 with the dasher male coupler 118 as shown in moving dasher 99 from its position at 99' through an arc about 55° to its vertical position in the tray as shown in FIG. 9. Further clockwise rotation of the motor drive arm 136 moves the linkage to its lower vertically aligned arrangement with the dasher rotated clockwise to its opposite arcuate position shown at 99'' in FIG. 9. Further rotation of the motor drive arm 136 causes the linkage to reverse the rotation of dasher arm link 132 and therefore the dasher 99 is rotated counterclockwise through about a 55° arc from its phantom position at 99'' to its vertical position 99 and thence to its phantom position 99' to complete the oscillation cycle imparted by the 360° rotation of motor drive arm 136. Thus it can be seen that rotation of motor drive arm 136 produces through links 135, 132 and guide arm 140 the required oscillating motion of dasher 99.

By mounting the motor rotor rear shaft 84 and front shaft 86 in journal bearings 85 and 87 respectively, the armature shaft or rotor 83 is thereby permitted to move freely in an axial direction under the influence of the magnetic field of the laminated stator 82 such that rotor declutching spring 88 normally biases the armature 83 in a declutched rearward position partially out of the stator bore opening to its dashed line position shown in FIG. 3. Clutch action is thus provided by virtue of the rotor moving axially forwardly into the stator bore causing nylon pinion gear 89, having a chamfered end, to engage its mating drive or spur gear 90. Thus, when full voltage is applied to the motor windings 81 the maximum magnetic force is applied and the rotor 83 moves fully to the right to provide clutch action and drive the gear members in gear box 91 and the output shaft 92 and oscillate coupled dasher 99 via linkage 98. When partial voltage is applied to the motor winding the reduced magnetic force is not sufficient to move the rotor 83 axially to the right against the force of spring 88 and provide the clutch action. As a result the armature stays in its left or declutched position and only the blower fan 70 is rotated to drawing cooling air into the housing through rear apertures 69 in the blower recess 68.

The electrical control chamber 78 includes a thermal control assembly switch housing 150 including a four-pole switch which is in circuit with the motor windings 81 and heater means in the form of an electrical resistance heater wire 152 which, as shown in FIG. 4, is wound in serpentine fashion on the upper surface of a heater mounting plate 76. The plate 76, preferably of aluminum sheet material, forms a horizontal partition separating the lower mixing chamber 74 and the upper control chamber 78.

In FIGS. 10 and 11 there is shown schematically the circuitry for electrically operating the various electrical parts of applicant's ice cream maker. The thermal control assembly 150 is shown in FIG. 10 in its control "ON" position with the setting of control knob 160 in its "Soft" position. The rotation of knob 160 causes its stem shaft 162 to rotate an OFF-ON cam 164 in a clockwise direction as viewed in FIG. 10 such that its flat tab 166 releases pressure on upwardly biased resilient bimetal contact blade 168 allowing its contact 169 to close to fixed contact "A" connected by line 170 to the side $L_2$ of a 120 Volt domestic power supply by means of plug 172. Thus, when the control knob 160 is turned to its "OFF" position the cam 164 opens contact A while second and third bimetal contact arms 174 and 176 are arranged such that when the temperature of the thermal control is above about 23° F. the contacts B and D are normally closed. It should be noted that the contour of cam 178 is such that it puts increasing bias on its associated bimetal arm 176 as it is rotated clockwise from "Soft" to "Hard" setting, requiring a lower bimetal temperature before contact D opens and then C closes.

With the control in its "ON" position and a "Soft" setting the motor winding 81 is energized via closed contacts A and B at full voltage, such that the gear motor pinion clutch 89 is engaged resulting in the dasher 99 being operated. During this time the fan 70 is operating to flow cold air over the mix in the tray, as seen by the arrows 180 in FIGS. 3 and 4, whose path is upward from the fan 70 through the rear air flow duct 182 for movement through air outlet 184 into the freezing chamber 74. As seen in FIG. 3 a passage 186 is provided in the top wall 188 of motor insulating cover or shroud 190 for directing a portion of the cooling air into the motor chamber 72 and over the motor and out openings 54 in housing 60. It will be noted in FIG. 10 that, with contact B closed to contact 192 of bimetal arm 174, the indicator lamp 53 and voltage dropping resistor 194 are bypassed and inoperative, even through contact D is closed to contact 196 of bimetal arm 176.

Turning now to the schematic FIG. 11, there is shown the control in its "Terminating Dashing" position wherein the temperature of the thermal control assembly has dropped, due to less heat given up to the cooling air by the mixing tray, such that contact B, which opens at a fixed temperature shown in FIG. 12, as about 23° F., opens. At this point the motor winding 81 is energized from $L_1$ via the voltage dropping resistor 194 and contacts D and A to $L_2$. This electrical path places about 60 volts on the motor and 60 volts across the dropping resistor 194 having a value of about 150 ohms in the disclosed form. Under such conditions the solenoid action on the rotor 83 is reduced and the declutch spring 88 moves the rotor 83 to the left in FIG. 3 until the pinion gear 89 disengages the spur gear 90 in the gear box. The result is that the dasher output drive 92 is declutched while the blower 70 operates to continue cooling down the mixing tray contents and the motor. It will be noted that the indicator lamp 53 is still bypassed by contact D.

The operation of the thermal control in its "Hold" position will now be described. Upon the temperature of the thermal control assembly having dropped to a predetermined "Soft" hold temperature which is about 20° F. in the form disclosed, contact D opens by virtue of bimetal arm 176 flexing upward or clockwise. The current now flows from $L_1$ through motor winding 81, voltage dropping resistor 194 to contact D, through line 208 to neon indicator lamp 53, and through line 206 to resistor 204, which has a value of about 30,000 ohms in the disclosed form, and thence via line 202 to terminal E and blade 168, contact 169, contact A and line 170 to line $L_2$. While the neon lamp 53 now glows, indicating the "Hold" temperature of the mix has been reached and the ice cream is ready to serve, the voltage across the motor is so low the motor will not run, therefore, the blower 70 no longer draws cold air across the mix tray and the motor.

The operation of the control at "Hold" position while energizing heater 152 is as follows: As the temperature of the thermal control assembly continues to drop at a slow rate because of heat exchange with the freezer compartment ambient air arm contact 176 closes to fixed contact C at a predetermined temperature, which in the discloses form is about 18° F. This energizes the heater 152 via L, closed contact C and contact A. The heater 152, having a value of about 40 watts in the form shown, gradually raises the thermal control and mixing tray temperature until the arm contact 196 is flexed counterclockwise to open contact C, thereby providing cyclic control of applied heat by the heater 152 to maintain the selected "Hold" temperature. The neon lamp 53 will remain energized as before and the motor will not operate because of the very low voltage applied thereto. It should be noted that if the thermal control temperature rises above the "Hold" temperature, contact 196 will close to fixed contact D to energize the motor at about one-half voltage and operate the blower.

As will be noted, the "Hold" temperature can be selected by turning knob 160. Turning the knob clockwise lowers the temperature at which bimetal blade 176 opens its contact 196 from contact D. As shown in FIG. 12, this opening occurs at about 20° F. for the "soft" setting, 16° F. for the "medium" setting and at about 12° F. for the "hard" setting, while the application of heat by contact 196 closing on contact C will occur at about 18° F., 14° F. and 10° F. respectively.

It will be noted that a terminal 220 is provided on the left side of the panel 52 for connection by means of insulated electrical power cord 222 with plug 172 in suitable electrical socket means such as a female socket 224 provided in combination with the cabinet light fixture 226. In this manner the ice cream maker 50 can be provided as an add-on feature for a refrigerator cabinet while allowing the entire unit to be removed for cleaning or servicing.

As seen in FIG. 9, the tray 100 has parallel runners or guides 230 integrally formed on the curved or arcuate bottom wall 102 to provide mounting legs for the tray. Also it will be noted that while the dasher 99 is shown with dual flexible plastic blades 232 and 234 for contact with the tray bottom wall 102, it will be appreciated that various designs could be used including a single bladed dasher without departing from the scope of the invention.

While the embodiment of the present invention as herein disclosed constitutes a preferred form, it is to be understood that other forms might be adopted.

I claim:

1. A frozen confection-making appliance for use in the freezer compartment of a refrigerator normally maintained at a below-freezing temperature, said appliance including a housing with an access opening having a freezing chamber and a machinery compartment separated by partition means, a freezing container for holding the confection to be congealed with said container adapted for removable reception in said housing freezing chamber, confection mixing means supported in said container, an electric motor disposed within said machinery compartment, said motor including an armature having first and second shaft portions, said first shaft portion connected to drive train means, said second shaft portion being drivingly connected to fan means, releasable coupling means for connecting said mixing means to the output of said drive train means upon insertion of said container into said chamber, thermostatic control means for declutching said first shaft portion from said drive train means, said fan means operative for drawing below-freezing air from said freezer compartment into said housing and through passage means into said freezing chamber in heat exchange relation with the confection, and said thermostatic control means being operative to sense the reduced temperature of the confection in said container, whereby said first shaft portion is automatically declutched from said drive train resulting in the stoppage of said mixing means while said motor continues to drive said blower means to circulate below freezing air over said container.

2. A frozen confection-making appliance for use in the freezer compartment of a refrigerator normally maintained at a below-freezing temperature, said appliance comprising a housing with a front access opening having a front freezing chamber and a rear machinery compartment separated by partition means, a freezing tray adapted for removable reception in said housing access opening, confection mixing means supported in said tray, an electric motor disposed within said machinery compartment, said motor including a bored stator, motor windings and an armature, said armature including forwardly and rearwardly extending shaft portions, said forward shaft portion having gear driving means thereon, drive train means including driven gear means, said rearwardly extending shaft portion being drivingly connected to fan means, releasable coupling means for connecting said mixing means to the output of said drive train means upon insertion of said tray into said housing, means for supporting said armature shaft in said stator bore whereby said armature is movable to a forward position upon a predetermined voltage being applied to said motor windings, declutching means normally biasing said armature to position partially withdrawn from said stator, said fan means operative for drawing below-freezing air from said freezer compartment into said housing and through passage means into said front freezing chamber in heat exchange relation with the confection in said tray, said driven gear means operative to mesh with said driving gear upon said armature being moved to its forward position, thermostatic control means operative for energizing said motor windings at said predetermined voltage during a confection mixing cycle of said appliance thereby driving said mixing means and said fan means, and said thermostatic control means being operative to sense the reduced temperature of the confection in said mixing tray whereby a reduced voltage is applied to said motor windings allowing said declutching means to move said armature gear driving means resulting in the stoppage of said mixing cycle while said motor continues to drive said blower means to circulate below freezing air over said mixing tray.

3. A frozen confection-making appliance for use in the freezer compartment of a refrigerator normally maintained at a below-freezing temperature, said appliance including an elongated housing with a front access opening having a front freezing chamber and a rear machinery compartment separated by partition means, a freezing tray for holding the confection to be congealed with said tray adapted for removable reception in said housing access opening, a confection dasher having front and rear extensions adapted to be supported in tray journal means so as to be oscillatory about a substantially horizontal axis in said tray during a confection agitation cycle, said dasher rear extension including a first half of a separable coupling, an electric motor disposed within said machinery compartment, said motor including a stator having a bore, windings and an armature shaft rotatable in said bore, said armature shaft including a forwardly extending portion having a pinion gear thereon and a rearwardly extending portion being drivingly connected to fan means, said armature having both its forwardly and rearwardly extending shaft portions supported in bearing means whereby said armature is movable by solenoid action to a forward position upon substantially full voltage being applied to said motor windings, declutching spring means normally biasing said armature to a rearward position partially withdrawn from said stator bore, said separable coupling having its second-half rotatably supported on said partition means for reception of said dasher extension one-half coupling upon said tray and dasher being located in said housing, said fan means operative for drawing below-freezing air from said freezer compartment into said housing and through passage means into heat exchange relation with the confection in said tray, gear means positioned in said machinery compartment operative to mesh with said shaft pinion gear upon said armature being moved to said forward position, said linkage means operatively connected to said second-half coupling to convert the rotary movement of said armature into oscillatory movement of said dasher, and thermostatic control means operative for energizing said motor winding at full voltage during a confection mixing cycle thereby oscillating said dasher and driving said fan, said thermostatic control means being operative to sense a predetermined reduced temperature of the confection in said tray whereby a reduced voltage is applied to said motor windings allowing said declutch spring to move said armature shaft pinion gear out of engagement with said gear means so that said dashing cycle is stopped while said motor continues to drive said blower means to circulate below freezing air over the confection in said mixing tray.

4. In an automatic frozen confection-making appliance for use in the freezer compartment of a refrigerator including a housing having a freezing chamber and a machinery compartment, a freezing container for holding the confection to be congealed, confection mixing means in said container, an electric motor in said machinery compartment, said motor including an armature having first and second shaft portions, said first shaft portion drivingly connected to said mixing means, said second shaft portion drivingly connected to fan means, said armature being axially movable by solenoid control means for declutching said first shaft portion from said mixing means, said fan means operative for drawing below-freezing air from said freezer compartment into said housing into heat exchange relation with the confection, heater means in said freezing chamber, and a thermostatic control mechanism to conduct the appliance through a series of operations, said thermostat including a manually adjustable control for setting said thermostat to provide for one or more consistencies of the frozen confection, said thermostat having a first, second and third thermomotive switch means arranged in heat exchange relation with said freezing chamber, setting of said manually adjustable control to a first consistency position said motor is energized at substantially full voltage by the closed condition of said first and second switch means causing both said mixing means and said blower to operate, upon the lowering of the temperature in said appliance chamber to a first predetermined value said second switch means opens whereby the motor winding is energized via a voltage dropping circuit to place a predetermined reduced voltage on said motor, said reduced voltage causing the armature to move axially by its solenoid action to declutch said mixing means while the reduced voltage is of sufficient value to continue to drive said fan means, upon the temperature of said appliance chamber falling a second predetermined value said third switch means moving to open said voltage dropping circuit resulting in the stoppage of said motor armature and closing a heater energizing said heater means, and said third switch means operative to cycle between said heater circuit and said voltage dropping circuit to hold said second predetermined temperature whereby the selected consistency of the confection is maintained until ready to serve.

5. The appliance as defined in claim 4 further including series wired lamp and resistor means connected in parallel with said third switch means, said lamp and resistor means being of a predetermined resistance substantially greater than said voltage dropping circuit, whereby upon said third switch means opening said voltage dropping circuit and said lamp and resistor means provide an alternate path for said motor voltage dropping circuit sufficient to light said lamp means indicating the confection is ready to serve while the voltage applied across the motor winding is of such a reduced value that said motor will not run.

* * * * *